(12) United States Patent
Kang

(10) Patent No.: US 12,248,536 B2
(45) Date of Patent: Mar. 11, 2025

(54) SYSTEM AND METHOD FOR STILL IMAGE-BASED MEDIA CONTENT MONITORING

(71) Applicant: DRM INSIDE CO., LTD., Seoul (KR)

(72) Inventor: Hogab Kang, Seoul (KR)

(73) Assignee: DRM INSIDE CO., LTD., Seoul (KR)

( * ) Notice: Subject to any disclaimer, the term of this patent is extended or adjusted under 35 U.S.C. 154(b) by 0 days.

(21) Appl. No.: 18/039,786

(22) PCT Filed: Dec. 24, 2020

(86) PCT No.: PCT/KR2020/019162
§ 371 (c)(1),
(2) Date: Jun. 1, 2023

(87) PCT Pub. No.: WO2022/124466
PCT Pub. Date: Jun. 16, 2022

(65) Prior Publication Data
US 2024/0098345 A1    Mar. 21, 2024

(30) Foreign Application Priority Data
Dec. 9, 2020   (KR) .................. 10-2020-0171067

(51) Int. Cl.
| H04N 7/10 | (2006.01) |
| G06F 16/783 | (2019.01) |
| G06F 21/10 | (2013.01) |
| G06T 3/40 | (2006.01) |
| G06V 10/44 | (2022.01) |
| G06V 10/74 | (2022.01) |

(Continued)

(52) U.S. Cl.
CPC ............ *G06F 21/10* (2013.01); *G06F 16/783* (2019.01); *G06T 3/40* (2013.01); *G06V 10/44* (2022.01); *G06V 10/761* (2022.01); *H04N 21/8352* (2013.01)

(58) Field of Classification Search
CPC ............... H04N 21/254; H04N 21/442; H04N 21/4627; H04N 21/8352; G06V 20/46; G06V 20/48; G06V 10/44; G06V 10/761
See application file for complete search history.

(56) References Cited

U.S. PATENT DOCUMENTS

2009/0052784 A1* 2/2009 Covell .................. G06F 16/783
382/209
2009/0328100 A1* 12/2009 Horiguchi .............. H04N 5/775
725/39

(Continued)

FOREIGN PATENT DOCUMENTS

| JP | 2011-237879 A | 11/2011 |
| KR | 10-2016-0107734 A | 9/2016 |

(Continued)

*Primary Examiner* — Gigi L Dubasky
(74) *Attorney, Agent, or Firm* — Heedong Chae; Lucem, PC

(57) ABSTRACT

Disclosed are a system and a method for still image-based media content monitoring and, more specifically, a system and a method for still image-based media content monitoring, in which a copied content obtained by illegally copying an original content, which is a video content such as a movie content or a broadcast content, is monitored on the basis of a still image, thereby preventing illegal distribution of the copied content.

9 Claims, 6 Drawing Sheets

(51) Int. Cl.
    *H04N 7/025*     (2006.01)
    *H04N 21/8352*     (2011.01)

(56) References Cited

U.S. PATENT DOCUMENTS

| | | | |
|---|---|---|---|
| 2011/0274360 A1* | 11/2011 | Watanabe | G06F 16/532 |
| | | | 382/217 |
| 2015/0195626 A1* | 7/2015 | Lee | H04N 21/4722 |
| | | | 725/34 |
| 2021/0027496 A1* | 1/2021 | Koyama | G06T 7/73 |
| 2021/0174090 A1* | 6/2021 | Fujikawa | H04N 5/77 |
| 2021/0287006 A1* | 9/2021 | Feng | G06V 10/82 |
| 2022/0198783 A1* | 6/2022 | Yoshida | G06V 10/454 |

FOREIGN PATENT DOCUMENTS

| | | |
|---|---|---|
| KR | 10-2018-0032949 A | 4/2018 |
| KR | 10-2052535 B1 | 1/2020 |

* cited by examiner

SYSTEM AND METHOD FOR STILL IMAGE-BASED MEDIA CONTENT MONITORING

CROSS-REFERENCE TO RELATED APPLICATIONS

This application claims the priority of Korean Patent Application No. 10-2020-0171067 filed on Dec. 9, 2020, in the Korean Intellectual Property Office, the disclosure of which is incorporated herein by reference.

BACKGROUND OF THE INVENTION

Field of the Invention

The present disclosure relates to a system and a method for still image-based media content monitoring and, more specifically, to a system and a method for still image-based media content monitoring, in which a copied content obtained by illegally copying an original content, which is a video content such as a movie content or a broadcast content, is monitored on the basis of a still image, thereby preventing illegal distribution of the copied content.

DESCRIPTION OF THE RELATED ART

Currently, with the development of the Internet, there has been provided a service that supports sharing of various video contents such as a movie content and a broadcast content between users through various media platforms such as web hard.

However, since these video contents consist of digital data and are easily copied, recently, there are frequently occurring cases in which considerable damage is caused to copyright holders of video contents by sharing copied contents obtained by illegally copying video contents.

In addition, when these copied contents are shared through the media platform, it is difficult to track an illegal user who produced the copied content because the spread rate of the illegal content is rapid.

As a method for blocking the production and sharing of these illegal contents, in the related art, there are emerging security methods of reproducing an original content as a video content only on authorized devices through security technologies such as digital rights management (DRM) or digital watermarking, and detecting a first copier in case of illegal copying. However, there is a problem in that these existing security methods are easily incapacitated according to the improvement of security release technology of illegal users.

Accordingly, recently, there has emerged a monitoring method for detecting an illegal user who first registers a copied content while blocking the distribution of the copied content in advance by detecting the registered copied content when the copied content obtained by copying an original content is registered on a web. However, in these existing monitoring methods, since the copied content and the original content are compared with each other for all images included in the content, in the case of a video content with a long reproduction time, it is not only inefficient in that considerable time and load are required for comparing the copied content and the original content, but also there is a problem that it is difficult to monitor all the contents with an existing inefficient monitoring method because the number of contents registered in the media platform is considerable.

The above-described technical configuration is the background art for helping in the understanding of the present disclosure, and does not mean a conventional technology widely known in the art to which the present disclosure pertains.

SUMMARY OF THE INVENTION

The present disclosure has been made in an effort to support the time and load required for detecting a copied video content to be greatly reduced and to block distribution of an illegally copied content in advance, by supporting a copied content corresponding to an original content to be accurately detected through comparison of feature points and similarity between a small number of frames extracted from the original content and the copied content obtained by illegally copying the original content which is the video content.

The present disclosure has also been made in an effort to support an illegally copied content to be easily detected even for a content which is difficult to secure an original content, by supporting a copied content obtained by illegally copying the original content corresponding to a trailer only with the trailer corresponding to the original content to be easily detected.

According to an aspect of the present disclosure, there is provided a method for still image-based media content monitoring including: an extraction step of receiving, by a video registration unit, an original content which is a video content and extracting a plurality of still images from the original content according to a predetermined condition; a registration step of generating, by the video registration unit, an original frame by converting the extracted still image to a preset standard, generating feature point information by extracting a feature point from the original frame, and then matching content identification information and an original frame of the original content corresponding to the feature point information and storing the matched information in a DB; a reception step of extracting, by a video identification unit, a still image from the search target video at a preset time interval when receiving the search target video and converting the extracted still image into the standard to generate a plurality of search target frames; a comparison step of performing, by the video identification unit, an operation process of extracting feature points from the search target frame and then comparing the extracted feature points with the feature point information stored in DB for each original content to calculate visual similarity to the search target frame for each of one or more original frames matched at a reference or more and generating comparison result information by collecting original frames having visual similarity equal to or greater than a preset first reference value for each of the plurality of search target frames; and a detection step of calculating, by a detection unit, the identification number by summing the number of comparison result information in which an original frame corresponding to an original content exists among the plurality of comparison result information corresponding to the plurality of search target frames for each different original content and detecting an original content matching the search target video based on the identification number.

As an example related to the present disclosure, the extraction step may further include extracting, by the video registration unit, n still images per second from the original content when the original content is a trailer by identifying whether the original content is the trailer.

As an example related to the present disclosure, when the original content is not the trailer, the extraction step may further include extracting, by the video registration unit, one still image per m seconds from the original content or extracting one representative image as a still image for each of a plurality of groups after generating the plurality of groups by grouping a plurality of frame images that are sequential in chronological order from the original content and have mutual visual similarity of a predetermined second reference value or more.

As an example related to the present disclosure, the standard may be a preset resolution to normalize a high-resolution image into a low-resolution image of a preset size.

As an example related to the present disclosure, the reception step may further include generating, by the video identification unit, reference feature point information by extracting a still image when receiving the search target video and then extracting a feature point from the extracted still image, identifying an original content matching feature point information most matching the reference feature point information while matching the reference feature point information at a predetermined second reference value or more by comparing the reference feature point information with feature point information stored in the DB, identifying the search target video as a trailer when the identified original content is the trailer, and identifying the search target video as a non-trailer when the identified original content is not the trailer; and extracting, by the video identification unit, n still images per second in a predetermined time section based on the still image used when identifying the search target video as the trailer by targeting the search target video when the search target video is not the trailer.

As an example related to the present disclosure, the reception step may further include setting, by the video identification unit, a random section in the search target video to extract a still image at a preset time interval within the random section or generating a plurality of different image groups by grouping frame images that have visual similarity greater than or equal to a preset first reference value within the random section, and then extracting one still image from each of the plurality of image groups, when the search target video is not the trailer.

As an example related to the present disclosure, in the comparison step, the visual similarity may be calculated by the video identification unit through a mean square error (MSE) or a structural similarity index map (SSIM).

As an example related to the present disclosure, the detection step may further include detecting, by the detection unit, an original content with the greatest identification number while the identification number is a predetermined reference number or more, as a content matching the search target video, based on the identification number calculated for each original content.

As an example related to the present disclosure, the detection step may further include generating and providing, by the detection unit, detection result information including content identification information of a specific original content detected as the original content matching the search target video and identification information of the search target video.

According to another aspect of the present disclosure, there is provided a system for still image-based media content monitoring including: a video registration unit configured to receive an original content which is a video content to extract a plurality of still images from the original content according to a predetermined condition, generate an original frame by converting the extracted still image to a preset standard, generate feature point information by extracting a feature point from the original frame, and then match content identification information and an original frame of the original content corresponding to the feature point information and store the matched information in a DB; a video identification unit configured to extract a still image from the search target video at a preset time interval when receiving the search target video and convert the extracted still image into the standard to generate a plurality of search target frames, perform an operation process of extracting feature points from the search target frame and then comparing the extracted feature points with the feature point information stored in DB for each original content to calculate visual similarity to the search target frame for each of one or more original frames matched at a reference or more, and generate comparison result information by collecting original frames having visual similarity equal to or greater than a preset first reference value for each of the plurality of search target frames; and a detection unit configured to calculate the identification number by summing the number of comparison result information in which an original frame corresponding to an original content exists among the plurality of comparison result information corresponding to the plurality of search target frames for each different original content and detect a specific original content having the largest identification number while the identification number is greater than or equal to a preset reference value, as a content matching the search target video.

According to the present disclosure, it is possible not only to easily and accurately detect the original content distributed with many similar frames which are not completely the same as the selected still image as a copy target of the copied content after excluding an inefficient process of comparing the original content and the copied content one-to-one for all frames in the related art and selecting a small number of still images from the copied content, but also to greatly reduce the time and load required to detect the copied content generated through illegal copying by converting a small number of still images from the original content and the copied content to a lower resolution and then detecting the copied content just by mutual comparison, thereby greatly improving efficiency in detecting the illegally copied content.

In addition, as described above, according to the present disclosure, it is possible to quickly and accurately detect the copied content with a low load, thereby preventing distribution of illegally copied contents in advance.

Further, according to the present disclosure, it is possible to support an illegally copied content to be easily detected even for a content which is difficult to secure an original content, by supporting a copied content obtained by copying the original content corresponding to a trailer only with the trailer corresponding to the original content to be easily detected.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, detailed embodiments of the present disclosure will be described with reference to the drawings.

Figure 1:
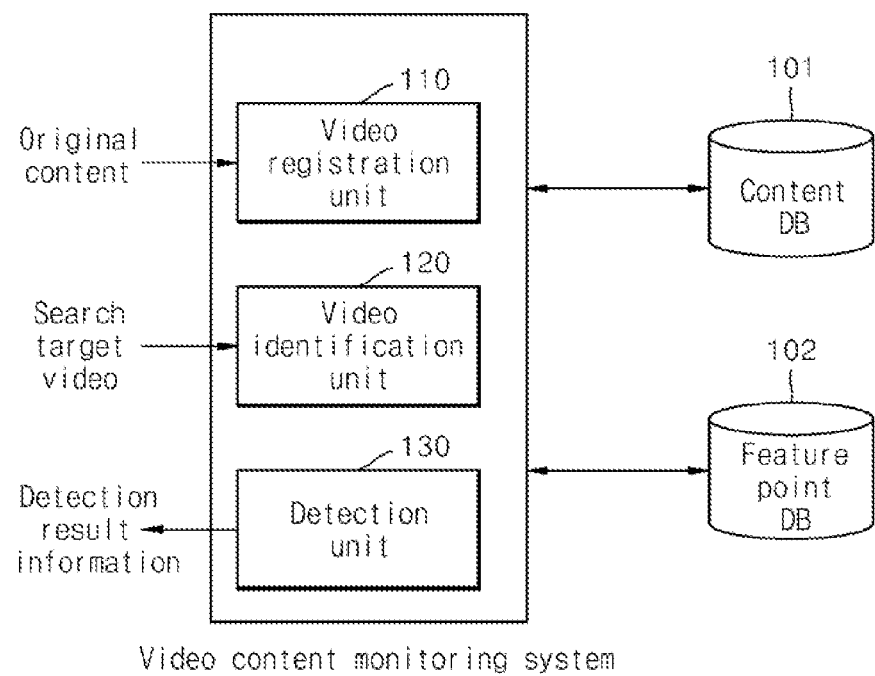
FIG. 1 is a block diagram of a system for a still image-based media content monitoring according to an embodiment of the present disclosure.

FIG. 1 is a block diagram of a system (hereinafter, monitoring system) for a still image-based media content monitoring according to an embodiment of the present disclosure.

As illustrated in FIG. 1, the monitoring system may be configured to include a video registration unit 110, a video identification unit 120, and a detection unit 130.

At this time, the monitoring system may be configured by one service device, and the video registration unit 110, the video identification unit 120, and the detection unit 130 may be included as components of the service device. In addition, the service device may be configured as a server.

Alternatively, each of the video registration unit 110, the video identification unit 120, and the detection unit 130 may be configured as an individual device to communicate with each other via a communication network. For example, each of the video registration unit 110, the video identification unit 120, and the detection unit 130 may be configured as an individual server.

In addition, the communication network described in the present disclosure may include a wired/wireless communication network, and examples of such a wireless communication network may include Wireless LAN (WLAN), Digital Living Network Alliance (DLNA), Wireless Broadband (WiBro), World Interoperability for Microwave Access (Wimax), Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), IEEE 802.16, Long Term Evolution (LTE), Long Term Evolution-Advanced (LTE-A), Wireless Mobile Broadband Service (WMBS), 5G mobile communication service, Bluetooth, Long Range (LoRa), Radio Frequency Identification (RFID), Infrared Data Association (IrDA), Ultra Wideband (UWB), ZigBee, Near Field Communication (NFC), Ultra Sound Communication (USC), Visible Light Communication (VLC), Wi-Fi, Wi-Fi Direct, etc. Further, examples of the wired communication network may include a wired local area network (LAN), wired wide area network (WAN), power line communication (PLC), USB communication, Ethernet, serial communication, optical/coaxial cables, etc.

In addition, any one of the video registration unit 110, the video identification unit 120, and the detection unit 130 may also be included in the other one.

Hereinafter, a detailed operation configuration of the monitoring system will be described with reference to flowcharts of FIGS. 2 to 4 based on the configuration of FIG. 1.

Figure 2:
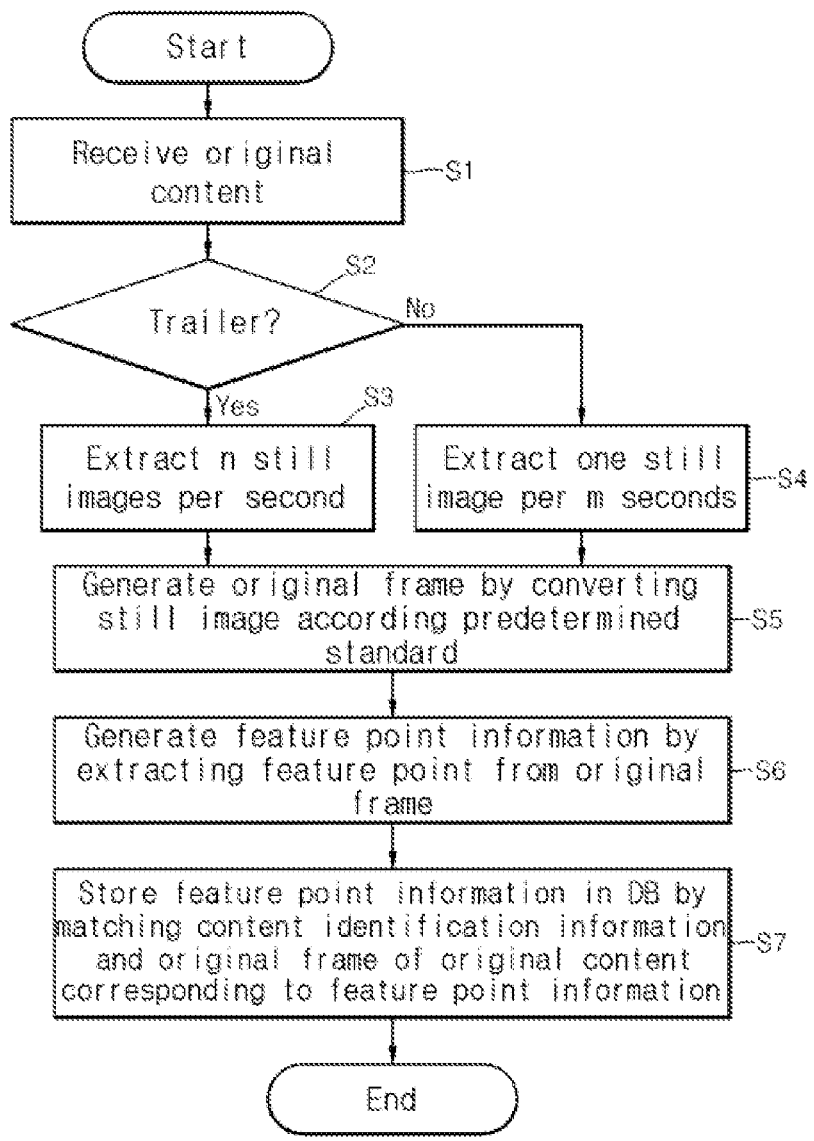
FIG. 2 is a flowchart for an original content registering process in the system for the still image-based media content monitoring according to the embodiment of the present disclosure.

FIG. 2 is an operational flowchart of the video registration unit 110 according to the embodiment of the present disclosure.

As illustrated in FIG. 2, the video registration unit 110 may receive an original content, which is a video content, and receive the original content by communicating with a user terminal, for example, via a communication network (S1).

In this case, the original content described in the present disclosure may include video contents or trailers requiring copyright protection, such as a movie content and a broadcast content.

In addition, the video registration unit 110 may extract a plurality of still images from the original content according to a first predetermined condition.

For example, when the original content is a trailer (S2), the video registration unit 110 may extract n still images per second from the original content (S3).

At this time, since when the original content is the trailer, a user terminal to register the original content transmits trailer-related information for identifying the original content as the trailer to be set in the original content or transmits the trailer-related information with the original content, the video registration unit 110 may determine whether the original content received from the user terminal is the trailer on the basis of the trailer-related information.

In addition, the video registration unit 110 may extract n still images per second by targeting the remaining section except for a start section (or intro section) which is a first continuous preset time section including a reproduction start point and an end section (or outro section) which is a second continuous preset time section including a reproduction end point with respect to the original content corresponding to the trailer.

In other words, since the start section includes the introduction of the content, characters, and the like, the end section includes the distribution date, distribution destination, and the like of the content, and the remaining section except for the start section and the end section includes the same frame image as an original content used to identify the copied content in the trailer-related content, the video registration unit 110 may acquire and register still images in the remaining section except for the start section and the end section so as to facilitate comparison with the copied content obtained by copying the original content later. At this time, the original content is used to generate a trailer-related content and may refer to a content that is screened, distributed, or broadcasted after the trailer-related content is distributed.

Alternatively, when the original content is not the trailer (S2), the video registration unit 110 may extract one still image per m seconds from the original content (S4).

Alternatively, when the original content is not a trailer, the video registration unit 110 may create a plurality of groups by grouping a plurality of frame images that are sequential in chronological order from the original content and have mutual visual similarity of a predetermined reference value or more, and then select one representative image for each of the plurality of groups to extract the selected representative image as the still image.

At this time, the video registration unit 110 may calculate the visual similarity between the frame images according to an image similarity comparison algorithm such as a mean square error (MSE) or a structural similarity index map (SSIM).

For example, the video registration unit 110 selects, as a reference image, a first frame image having the earliest (first) reproduction order among the plurality of frame images included in the original content, calculates visual similarity with the reference image for each of the plurality of consecutive frame images after the first frame image in the reproduction order, and group the reference image (first frame image) to a previous frame image of the specific frame image into a specific group when confirming the specific frame image in which the calculated visual similarity is less than a preset reference value.

In addition, after generating the specific group, the video registration unit 110 may set the specific frame image as the reference image and then calculate visual similarity to the reference image in the reproduction order with respect to each of the plurality of frame images consecutive to the specific frame image in the original content, and group the reference image (specific frame image) to a previous frame image of another specific frame image into another group different from the specific group when confirming another specific frame image in which the calculated visual similarity is less than a preset reference value.

As described above, the video registration unit 110 may generate a plurality of groups by repeating a process of generating a new group in the same manner as the previous group by changing the reference image to the confirmed frame image while generating a group by collecting one or more frame images in which the visual similarity to the reference image is a preset reference value or more whenever confirming frame images in which the visual similarity to the reference image is less than the preset reference value, until a final frame image of the original content is confirmed, and select a representative image for each of the plurality of generated groups.

In addition, the video registration unit 110 may select a frame image having the earliest reproduction order in each of the plurality of groups as the representative image or select a frame image having the highest clearness in each of the plurality of groups as the representative image, and may select the representative image in various methods without being limited thereto.

In addition, the monitoring system may be configured to include a content DB 101 and a feature point DB 102 as illustrated in FIG. 1, and the content DB 101 and the feature point DB 102 may also be configured as one original DB.

In addition, the video registration unit 110 may store the original content in the content DB 101.

In addition, the video registration unit 110 may convert the still image to a preset standard for each of the plurality of still images extracted from the original content to generate an original frame (S5), extract a feature point for each original frame to generate feature point information (S6), and then match the feature point information with content identification information and an original frame of the original content corresponding to the feature point information to store the matched feature point information in the feature point DB 102 (S7).

At this time, the video registration unit 110 may convert and normalize the still image to a preset standard corresponding to a resolution of 320×240, and the resolution set to the standard may be changed and set to various sizes.

That is, the standard set in the video registration unit 110 is a preset resolution to normalize a high-resolution image into a low-resolution image of a preset size.

In addition, the video registration unit 110 may match content identification information (e.g., content ID, content title, etc.) with the feature point information and the original frame together with the original content to store the matched content identification information in the feature point DB 102.

In this case, the feature point information may include frame identification information (e.g., content ID, frame time information, etc.) of the still image corresponding to the original frame, feature point data for feature points extracted from the original frame, and the like.

As described above, the video registration unit 110 may receive a plurality of original contents from one or more external devices by communicating with one or more external devices via a communication network, extract a plurality of still images for each of the plurality of original contents and convert the extracted still images into original frames, and then match feature point information generated for each of the plurality of original frames with content identification information of the corresponding original content to store matched feature point information in the feature point DB 102 and store the plurality of original contents in the content DB 101, and classify a plurality of feature point information and a plurality of original frames of the plurality of original contents for each original content to register the plurality of feature point information and the plurality of original frames in an original DB including the content DB 101 and the feature point DB 102.

At this time, the video registration unit 110 may match content identification information (e.g., content ID) of the original content corresponding to the feature point information with the feature point information when storing the feature point information in the feature point DB 102 to store the matched information in the feature point DB 102, match content identification information of the original content with the original content when storing the original content in the content DB 101 to store the matched information in the content DB 101, and match the feature point information corresponding to the original content with the original content on the basis of the content identification information of the original content for each of the plurality of original contents to register the matched original content in the original DB.

Figure 3:
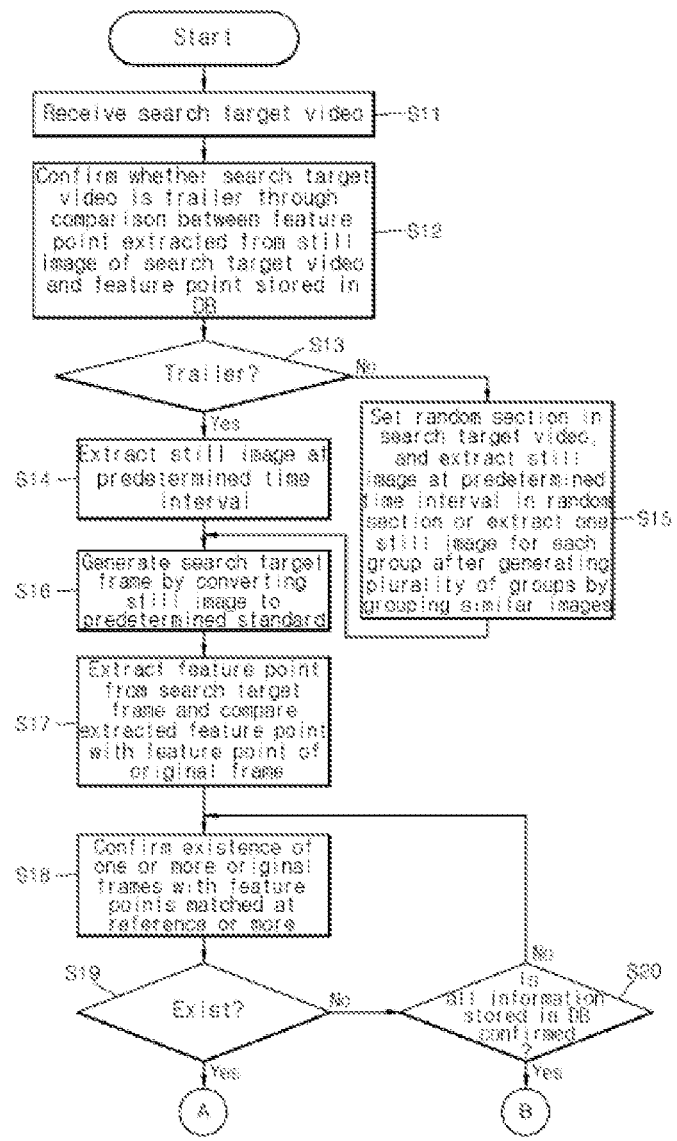
FIGS. 3 and 4 are flowcharts for a copied content detecting process in the system for the still image-based media content monitoring according to the embodiment of the present disclosure.
Figure 4:
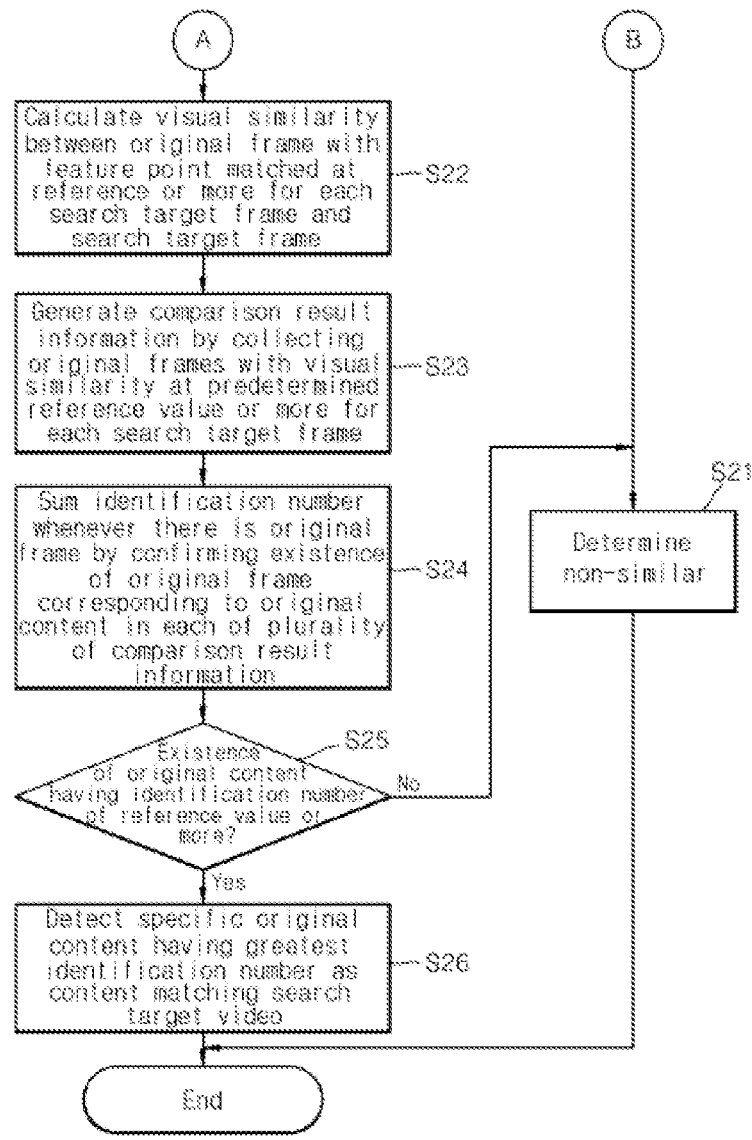

Meanwhile, FIGS. 3 and 4 are operational flowcharts for detecting an illegally copied content by the video identification unit 120 and the detection unit 130 according to an embodiment of the present disclosure.

First, the video identification unit 120 may receive request information including a search target video for a request to check an illegally copied content of the search target video from an external device such as a user terminal via a communication network, or receive (or collect) the search target video from the external server by accessing the external server via the communication network (S11).

In addition, the video identification unit 120 may extract a plurality of still images from the original content according to a second predetermined condition.

First, the video identification unit 120 may receive request information including the search target video or extract one still image per m seconds when receiving the search target video, extract a feature point from the extracted still image to generate reference feature point information and then compare the reference feature point information with the feature point information stored in the feature point DB 102, and identify content identification information of the original content matched with the most matching feature point information among feature point information stored in the feature point DB 102 matched with the reference feature point information at a reset set value or more in the feature point DB 102.

At this time, the set value may mean a preset value in the video identification unit 120 for comparison with the matching degree between the reference feature point information and the feature point information calculated by comparing the reference feature point information with the feature point information stored in the feature point DB 102.

In addition, when there is no feature point information that matches the reference feature point information of the extracted still image at the set value or more, the video identification unit 120 may generate reference feature point information with respect to a still image extracted from the search target video next to the extracted still image and then perform the comparing process and the identifying process as described above.

Thereafter, the video identification unit 120 may identify a specific original content that matches specific content identification information and identify whether the specific original content is a trailer by searching the content DB 101 on the basis of the specific content identification information identified on the basis of the reference feature point information in the feature point DB 102 (S12).

Further, when the specific original content is a trailer (S13), the video identification unit 120 may identify the search target video as the trailer, extract n still images per second (for example, 10 still images per second) within a preset time section based on a still image used when the search target video is identified as the trailer by targeting the search target video (S14), and then generate a plurality of search target frames by converting the extracted still image into preset standards (S16).

At this time, the video identification unit 120 converts the still image extracted from the search target video into a normalized image of 320×240 resolution, which is the same standard as the standard set in the video registration unit 110, to generate the search target frame, and the standards may be variously changed and set.

That is, the standard set in the video identification unit 120 is a preset resolution to normalize a high-resolution image into a low-resolution image of a preset size.

In addition, when the specific original content identified in correspondence with the reference feature point information is not the trailer (S13), the video identification unit 120 may set a random section (random reproduction section) in the search target video to extract a still image at a preset time interval within the random section, or generate a plurality of different image groups by grouping frame images that are sequential in chronological order and have visual similarity greater than or equal to a preset first reference value within the random section, and then extract one still image from each of the plurality of image groups.

For example, the video identification unit 120 may set a random section in the search target video because the number of frame images is large when the search target video is not the trailer, and extract one still image per m seconds or one still image per minute (e.g., one still image per minute) within the random section.

Figure 5:
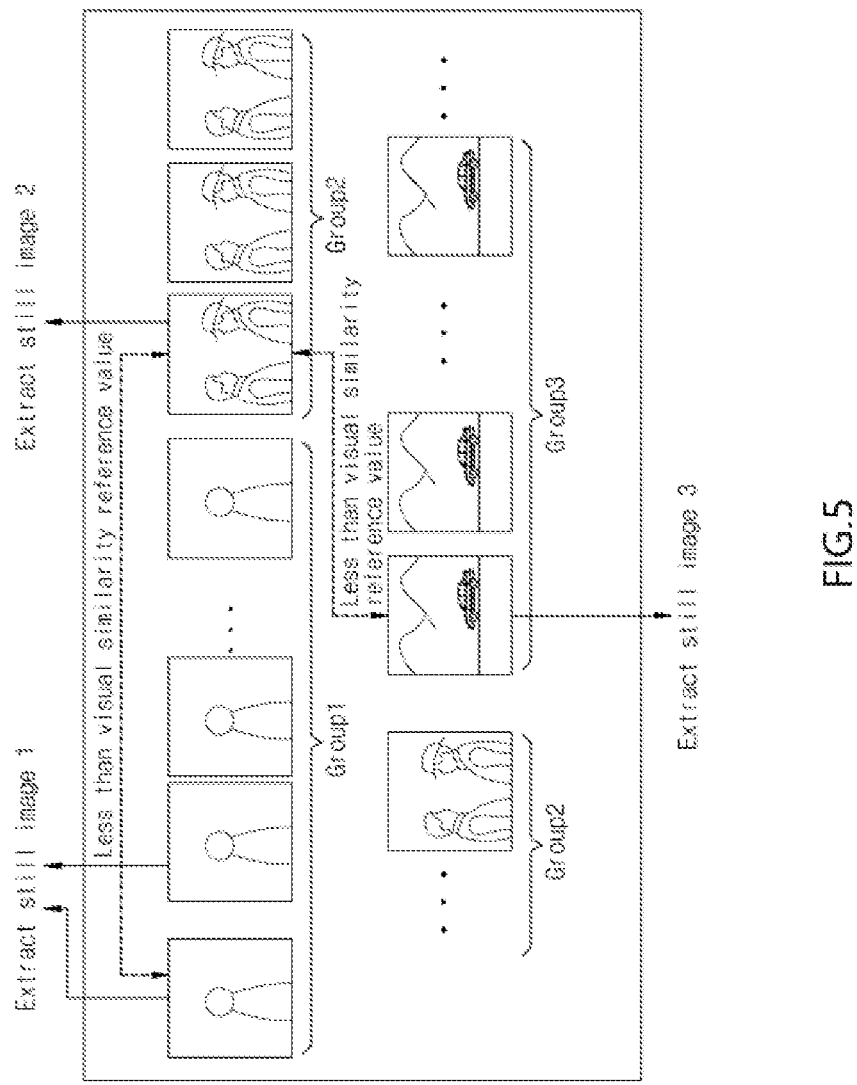
FIGS. 5 and 6 are operational exemplary diagrams in the system for the still image-based media content monitoring according to the embodiment of the present disclosure.

As another example, as illustrated in FIG. 5, the video identification unit 120 may select a first frame image in the earliest (first) reproduction order among a plurality of frame images included in a random section in the search target video as a reference image, calculate visual similarity to the reference image for each of the plurality of consecutive frame images in the order of reproduction time within the random section after the first frame image in reproduction order, and group the reference image (first frame image) to a previous frame image of the first frame image into a first group when the first frame image in which the calculated visual similarity is less than a preset first reference value is confirmed.

In this case, the first reference value set in the video identification unit 120 and the reference value set in the video registration unit 110 may be the same as or different from each other.

In addition, the video identification unit 120 may set the first frame image as the reference image after generating the first group for the search target video, calculate visual similarity to the reference image (first frame image) in reproduction order for each of the plurality of consecutive frame images next to the first frame image within the random section, and group the reference image (first frame image) to a previous frame image of the second frame image into a second group when the second frame image in which the calculated visual similarity is less than the preset first reference value is confirmed.

As described above, the video identification unit 120 may select a random section from the search target video, generate a plurality of groups to correspond to the search target video by repeating a process of selecting a frame image in the earliest reproduction order within the random section to set the selected frame image as the reference image, changing the reference image to the confirmed frame image while generating a group whenever a frame image in which visual similarity to the reference image is less than a preset first reference value is confirmed, and then generating a new group on the basis of the changed reference image, until a final frame image of the search target video is confirmed, and select a representative image one by one for each of the plurality of generated groups.

In addition, the video identification unit 120 may extract one representative image selected from each of the plurality of groups generated to correspond to the search target video as the still image.

At this time, the video identification unit 120 may select a frame image having the earliest (first) reproduction order in each of the plurality of groups as the representative image or select a frame image having the highest clearness in each of the plurality of groups as the representative image, and may select the representative image in various methods without being limited thereto.

In addition, the video identification unit 120 may calculate visual similarity according to an image similarity comparison algorithm such as a mean square error (MSE) or a structural similarity index map (SSIM).

Meanwhile, the video identification unit 120 may preset an operation algorithm (or first algorithm) to perform an operation process of extracting feature points from the search target frame and then comparing the extracted feature points with the feature point information stored in the content DB 101 (or original DB) for each original content to calculate visual similarity to the search target frame for each of one or more original frames matched at a reference or more.

Accordingly, when a plurality of search target frames are generated for the search target video, the video identification unit 120 may perform the operation process according to the algorithm for each of the plurality of search target frames.

For example, the video identification unit 120 may extract a feature point from a specific search target frame among a plurality of search target frames generated to correspond to the search target video, generate search target feature point information including the feature point extracted from the specific search target frame, and compare the search target feature point information with a plurality of feature point information stored in the feature point DB 102 (S17).

When there is no feature point information in the feature point DB 102 that matches the feature point information generated for at least one of the plurality of search target frames at a reference or more (S18 and S19), the video identification unit 120 may determine that there is no original content that matches the search target video, and provide determination result information of determining that the search target video is not the illegally copied content (S20 and S21).

In addition, the video identification unit 120 may extract at least one feature point information that matches (similar to) the search target feature point information at a preset second reference value or more from the feature point DB 102.

At this time, the second reference value means a predetermined reference level in the video identification unit 120 for comparing the matching degree between the search target feature point information calculated by comparing the search target feature point information with the feature point information stored in the feature point DB 102 and the feature point information stored in the feature point DB 102.

In addition, the setting value set in the video identification unit 120 and the second reference value may be the same as each other.

In addition, the video identification unit 120 may extract an original frame matching the specific feature point information extracted from the feature point DB 102 from the feature point DB 102 based on the search target feature point information.

Accordingly, the video identification unit 120 may perform the same operation process as the operation process of extracting an original frame corresponding (matched) to the search target feature point information at a predetermined second reference value or more to acquire one or more original frames corresponding to the extracted one or more feature point information to correspond to a specific search target frame corresponding to the search target feature point information.

In this case, the obtained one or more original frames may be images corresponding to one original content or images corresponding to a plurality of different original contents.

In addition, the video identification unit 120 may perform visual comparison with the specific search target frame for each of one or more original frames acquired to correspond to the specific search target frame to calculate visual similarity with the specific search target frame for each of the obtained one or more original frames (S22).

At this time, the video identification unit 120 may calculate the visual similarity between the specific search target frame and the original frame according to an image similarity comparison algorithm such as a mean square error (MSE) or a structural similarity index map (SSIM).

In addition, the video identification unit 120 may perform a process of acquiring one or more original frames based on the extracted feature points after extracting feature points for the specific search target frame and calculating the visual similarity for each of the acquired one or more original frames with respect to each of the plurality of search target frames generated to correspond to the search target video to calculate visual similarity for each of the acquired original frames after acquiring one or more original frames for each of the plurality of search target frames.

Figure 6:
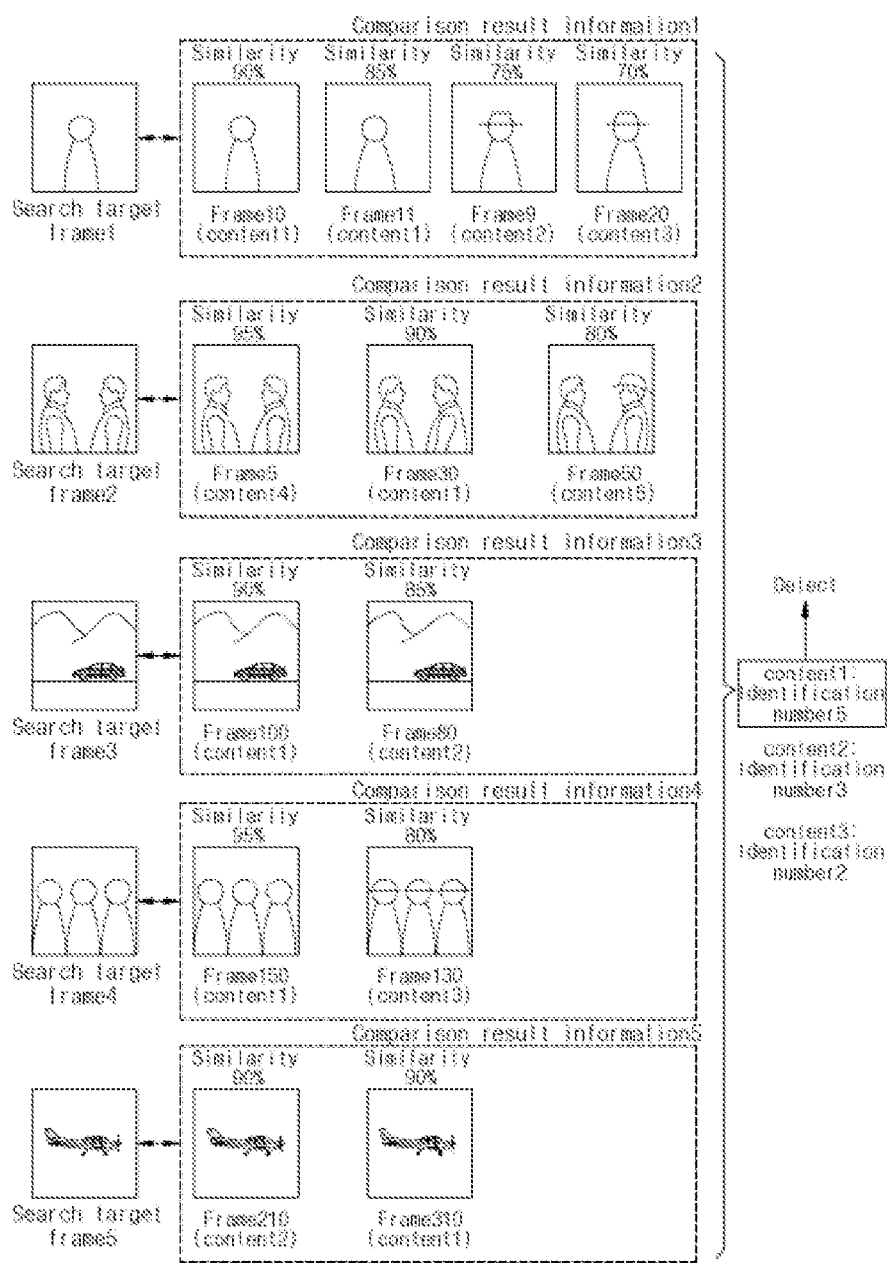

Meanwhile, as illustrated in FIG. 6, the video identification unit 120 may confirm the visual similarity of one or more original frames acquired for each of the plurality of search target frames, confirm an original frame having the visual similarity equal to or greater than a preset third reference value for each of the plurality of search target frames as a candidate image, collect the candidate images whenever the candidate images are confirmed, and generate comparison result information including one or more original frames confirmed as the candidate images (S23).

Hereinafter, for convenience of explanation, the original frame confirmed as the candidate image will be described as a candidate image.

In this case, the comparison result information may include a search target frame and one or more candidate images matching the search target frame.

In addition, the video identification unit 120 may generate comparison result information including one or more candidate images for each of the plurality of search target frames to generate a plurality of comparison result information corresponding to the plurality of search target frames, respectively.

In addition, the video identification unit 120 may provide (transmit) a plurality of comparison result information corresponding to the plurality of search target frames and search request information including search target videos corresponding to the plurality of search target frames to be matched with each other to the detection unit 130.

In addition, when receiving the search request information from the video identification unit 120, the detection unit 130 may confirm the existence of a candidate image corresponding to a specific original content in each of the plurality of comparison result information included in the search request information, and calculate the identification number by summing the number of comparison result information in which a candidate image corresponding to a specific original content exists among the plurality of comparison result information (S24).

At this time, the detection unit 130 may identify content identification information that matches the candidate image in the feature point DB 102, and identify an original content corresponding to the candidate image based on the identified content identification information or identify an original content corresponding to the candidate image by searching the content DB 101 based on the identified content identification information.

In addition, the detection unit 130 may calculate the identification number for each of the plurality of original contents corresponding to the plurality of candidate images included in the plurality of comparison result information, detect a specific original content with the greatest identification number while the identification number among the plurality of candidate contents is a predetermined reference number or more, as a content matching the search target video, and generate and provide detection result information including the specific original content and the search target video (S25 and S26).

That is, the detection unit 130 may generate and provide detection result information corresponding to the search target video to provide that the search target video is a copied content obtained by copying a specific original content included in the detection result information.

In addition, the detection unit 130 may extract content identification information of the specific original content detected as the original content matching the search target video from the content DB 101 or the feature point DB 102, and also generate and provide detection result information including identification information of the specific original content and identification information of the search target video.

At this time, the detection unit 130 may transmit the detection result information to an external device for transmitting the search target video via a communication network.

As an example for the aforementioned configuration, as illustrated in FIG. 6, the video identification unit 120 may acquire one or more original frames in which feature points match a first search target frame at a reference or more by comparing feature points among five search target frames obtained for the search target video, and calculate visual similarity with the first search target frame for each of the one or more original frames to generate first comparison result information about each original frame having the visual similarity equal to or higher than a preset third reference value as a candidate image.

In addition, the video identification unit 120 may generate second to fifth comparison result information corresponds to the second to fifth search target frames in the same process as generating the first comparison result information corresponding to the first search target frame for each of the five search target frames.

Next, the detection unit 130 may identify content identification information of a first original content (Content 1) corresponding to a first candidate image included in any one of the first to fifth comparison result information generated through the video identification unit 120 in the feature point DB 102, and search the first to fifth comparison result information based on the content identification information of the first original content and the information stored in the feature point DB 102 to confirm whether a candidate image corresponding to the first original content exists in each of the first to fifth comparison result information.

In addition, the detection unit 130 may calculate the identification number as five when the candidate images corresponding to the first original content are all present in the first to fifth comparison result information.

At this time, the detection unit 130 may count the identification number counted in correspondence with the specific comparison result information and the specific original content as one even if a plurality of candidate images corresponding to a specific original content exist in the specific comparison result information.

In addition, the detection unit 130 may search the first to fifth comparison result information based on content identification information of a second original content (Content 2) corresponding to the second candidate image included in any one of the first to fifth comparison result information generated through the video identification unit 120 and the information stored in the feature point DB 102 and calculate the identification number corresponding to the second original content as three when the comparison result information in which the candidate image corresponding to the second original content exists is the first comparison result information, the third comparison result information, and the fifth comparison result information.

In addition, the detection unit 130 may calculate the identification number as two in correspondence with a third original content (Content 3) corresponding to a third candidate image included in any one of the first to fifth comparison result information generated through the video identification unit 120.

Accordingly, the detection unit 130 may identify and detect the first original content having the largest identification number while the identification number is three or more, which is a preset reference number, among the first to third original contents, as a content matching a search target video corresponding to the first to fifth comparison result information.

As described above, according to the present disclosure, the copied content can be detected as a content obtained by illegally copying the specific original content by extracting a small number of still images from each of the original content, which is a video content, and the copied content obtained by illegally copying the original content to change the extracted still images to a lower quality resolution, selecting one or more frames of the original content that match the frame of the copied content with feature points at a reference or more through feature point comparison, calculating visual similarity to the frame of the copied content for each selected frame, and easily identify a specific original content including many frames with visual similarity above the reference as a content matching the copied content. Accordingly, it is possible not only to easily and accurately detect the original content distributed with many similar frames which are not completely the same as the selected still image as a copy target of the copied content after excluding an inefficient process of comparing the original content and the copied content one-to-one for all frames in the related art and selecting a small number of still images from the copied content, but also to greatly reduce the time and load required to detect the copied content generated through illegal copying by converting a small number of still images from the original content and the copied content to a lower resolution and then detecting the copied content just by mutual comparison, thereby greatly improving efficiency in detecting the illegally copied content.

In addition, as described above, according to the present disclosure, it is possible to quickly and accurately detect the copied content with a low load, thereby preventing distribution of illegally copied contents in advance.

Further, according to the present disclosure, it is possible to support an illegally copied content to be easily detected even for a content which is difficult to secure an original content, by supporting a copied content obtained by copying the original content corresponding to a trailer only with the trailer corresponding to the original content to be easily detected.

For example, the components described in the embodiments of the present disclosure may be implemented using one or more general-purpose computers or special-purpose computers, such as hardware such as a storage unit such as a memory, a processor, a controller, an arithmetic logic unit (ALU), a digital signal processor, a microcomputer, a field programmable gate array (FPGA), a programmable logic unit (PLU), and a microprocessor, software including instruction sets, and combinations thereof, or other any devices capable of executing and responding instructions.

The aforementioned contents can be corrected and modified by those skilled in the art without departing from the essential characteristics of the present disclosure. Therefore, the exemplary embodiments disclosed in the present disclosure are intended not to limit the technical spirit of the present disclosure but to describe the present disclosure and the scope of the technical spirit of the present disclosure is not limited by these exemplary embodiments. The protective scope of the present disclosure should be construed on the basis of the appended claims, and all the technical spirits in the equivalent scope thereof should be construed as falling within the scope of the present disclosure.

What is claimed is:

1. A method for still image-based media content monitoring comprising:
    an extraction step of receiving, by a video registration unit, an original content which is a video content and extracting a plurality of still images from the original content according to a predetermined condition;
    a registration step of generating, by the video registration unit, an original frame by converting the extracted still image to a preset standard, generating feature point information by extracting a feature point from the original frame, and then matching content identification information and an original frame of the original content corresponding to the feature point information and storing the matched information in a database;
    a reception step of extracting, by a video identification unit, a still image from a search target video at a preset time interval when receiving the search target video and converting the extracted still image from the search target video into the preset standard to generate a plurality of search target frames;
    a comparison step of performing, by the video identification unit, an operation process of extracting feature points from the search target frame and then comparing the extracted feature points from the search target frame with the feature point information stored in the database for each original content to calculate visual similarity to the search target frame for each of one or more original frames matched at a reference or more and generating comparison result information by collecting original frames having visual similarity equal to or greater than a preset first reference value for each of the plurality of search target frames; and
    a detection step of calculating, by a detection unit, an identification number by summing a number of comparison result information in which an original frame corresponding to an original content exists among a plurality of comparison result information corresponding to the plurality of search target frames for each different original content and detecting an original content matching the search target video based on the identification number, and
    wherein the reception step further comprises
    generating, by the video identification unit, reference feature point information by extracting a still image when receiving the search target video and then extracting a feature point from the extracted still image from the search target video, identifying an original content matching feature point information most matching the reference feature point information while matching the reference feature point information at a predetermined second reference value or more by comparing the reference feature point information with feature point information stored in the database, identifying the search target video as a trailer when the identified original content is the trailer, and identifying the search target video as a non-trailer when the identified original content is not the trailer; and
    extracting, by the video identification unit, still images per second in a predetermined time section based on the still image from the original content used when identifying the search target video as the trailer by targeting the search target video when the search target video is not the trailer.

2. The method for still image-based media content monitoring of claim 1, wherein the extraction step further comprises extracting, by the video registration unit, a preset number of still images per second from the original content when the original content is a trailer by identifying whether the original content is the trailer.

3. The method for still image-based media content monitoring of claim 2, wherein when the original content is not the trailer, the extraction step further comprises extracting, by the video registration unit, one still image per preset seconds from the original content or extracting one representative image as a still image for each of a plurality of groups after generating the plurality of groups by grouping a plurality of frame images that are sequential in chronological order from the original content and have mutual visual similarity of a predetermined second reference value or more.

4. The method for still image-based media content monitoring of claim 1, wherein the preset standard is a preset resolution to normalize a high-resolution image into a low-resolution image of a preset size.

5. The method for still image-based media content monitoring of claim 1, wherein the reception step further comprises
    setting, by the video identification unit, a random section in the search target video to extract a still image at a preset time interval within the random section or generating a plurality of different image groups by grouping frame images that have visual similarity greater than or equal to a preset first reference value within the random section, and then extracting one still image from each of the plurality of image groups, when the search target video is not the trailer.

6. The method for still image-based media content monitoring of claim 1, wherein in the comparison step, the visual similarity is calculated by the video identification unit through a mean square error (MSE) or a structural similarity index map (SSIM).

7. The method for still image-based media content monitoring of claim 1, wherein the detection step further comprises detecting, by the detection unit, an original content with a greatest identification number while the identification number is a predetermined reference number or more, as a content matching the search target video, based on the identification number calculated for each original content.

8. The method for still image-based media content monitoring of claim 1, wherein the detection step further comprises generating and providing, by the detection unit, detection result information including content identification information of a specific original content detected as the original content matching the search target video and identification information of the search target video.

9. A system for still image-based media content monitoring comprising:
    a video registration unit configured to receive an original content which is a video content to extract a plurality of still images from the original content according to a predetermined condition, generate an original frame by converting the extracted still image to a preset standard, generate feature point information by extracting a feature point from the original frame, and then match content identification information and an original frame of the original content corresponding to the feature point information and store the matched information in a database;
    a video identification unit configured to extract a still image from a search target video at a preset time interval when receiving the search target video and convert the extracted still image from the search target video into the preset standard to generate a plurality of search target frames, perform an operation process of extracting feature points from the search target frame and then comparing the extracted feature points from the search target frame with the feature point information stored in the database for each original content to calculate visual similarity to the search target frame for each of one or more original frames matched at a reference or more, and generate comparison result information by collecting original frames having visual similarity equal to or greater than a preset first reference value for each of the plurality of search target frames; and a detection unit configured to calculate an identification number by summing a number of comparison result information in which an original frame corresponding to an original content exists among a plurality of comparison result information corresponding to the plurality of search target frames for each different original content and detect a specific original content having a largest identification number while the identification number is greater than or equal to a preset reference value, as a content matching the search target video, and wherein the video identification unit configure to generate reference feature point information by extracting a still image when receiving the search target video and then extracting a feature point from the extracted still image from the search target video, identifying an original content matching feature point information most matching the reference feature point information while matching the reference feature point information at a predetermined second reference value or more by comparing the reference feature point information with feature point information stored in the database, identifying the search target video as a trailer when the identified original content is the trailer, and identifying the search target video as a non-trailer when the identified original content is not the trailer; and wherein the video identification unit configure to extract still images per second in a predetermined time section based on the still image from the original content used when identifying the search target video as the trailer by targeting the search target video when the search target video is not the trailer.

* * * * *